US010865518B2

(12) United States Patent
Chung

(10) Patent No.: US 10,865,518 B2
(45) Date of Patent: Dec. 15, 2020

(54) PAPERLESS TRANSFER PRINTING METHOD

(71) Applicants: Newtech Textile Technology Development (Shanghai) Co., LTD, Shanghai (CN); Po-Wen Chung, Shanghai (CN)

(72) Inventor: Po-Wen Chung, Shanghai (CN)

(73) Assignees: NEWTECH TEXTILE TECHNOLOGY DEVELOPMENT (SHANGHAI) CO., LTD., Shanghai (CN); Po-Wen Chung, Shanghai (CN)

( * ) Notice: Subject to any disclaimer, the term of this patent is extended or adjusted under 35 U.S.C. 154(b) by 205 days.

(21) Appl. No.: 16/318,213

(22) PCT Filed: Feb. 16, 2017

(86) PCT No.: PCT/CN2017/073759
§ 371 (c)(1),
(2) Date: Jan. 16, 2019

(87) PCT Pub. No.: WO2018/120376
PCT Pub. Date: Jul. 5, 2018

(65) Prior Publication Data
US 2019/0264384 A1    Aug. 29, 2019

(30) Foreign Application Priority Data

Dec. 27, 2016 (CN) .......................... 2016 1 1225658

(51) Int. Cl.
*D06P 5/24* (2006.01)
*D06P 1/16* (2006.01)
*D06P 1/38* (2006.01)
*D06P 1/39* (2006.01)
*D06P 1/44* (2006.01)
*B41M 5/00* (2006.01)
*B41M 5/03* (2006.01)
*B41F 16/00* (2006.01)
*C09D 11/033* (2014.01)
*C09D 11/037* (2014.01)

(52) U.S. Cl.
CPC .............. *D06P 5/003* (2013.01); *B41F 16/00* (2013.01); *B41M 5/00* (2013.01); *B41M 5/03* (2013.01); *C09D 11/033* (2013.01); *C09D 11/037* (2013.01); *D06P 1/16* (2013.01); *D06P 1/38* (2013.01); *D06P 1/39* (2013.01); *D06P 1/44* (2013.01)

(58) Field of Classification Search
None
See application file for complete search history.

(56) References Cited

U.S. PATENT DOCUMENTS

2005/0139096 A1\* 6/2005 Lu .......................... B41J 3/4078
101/33

FOREIGN PATENT DOCUMENTS

| CN | 1091190 C | 9/2002 |
|---|---|---|
| CN | 101144246 A | 3/2008 |
| CN | 101408004 A | 4/2009 |
| CN | 101570942 A | 11/2009 |
| CN | 101786373 A | 7/2010 |
| CN | 101899789 A | 12/2010 |
| CN | 102417566 A | 4/2012 |
| TW | 201204898 A1 | 2/2012 |
| WO | 02096660 A1 | 12/2002 |

OTHER PUBLICATIONS

International Search Report issued in PCT/CN2017/073759 dated Aug. 24, 2017.

\* cited by examiner

*Primary Examiner* — Joshua D Zimmerman
(74) *Attorney, Agent, or Firm* — McClure, Qualey & Rodack, LLP

(57) ABSTRACT

A paperless transfer printing method includes the following steps: (a) printing, by a printing machine, aqueous ink onto a transfer printing temporary carrier in a set pattern, wherein a surface of the transfer printing temporary carrier is made of an elastic polymer material and a surface tension of the aqueous ink is less than the critical surface tension of the transfer printing temporary carrier; (b) drying the to-be-transferred pattern on the transfer printing temporary carrier; (c) wetting the transfer printing temporary carrier by using an aqueous surface tension increasing liquid; and (d) separating the aqueous solution or the aqueous dispersion liquid from the transfer printing temporary carrier at a tight-contact position between the transfer printing temporary carrier and the fabric, so that an aqueous ink dye is transferred onto the fiber of the fabric.

20 Claims, No Drawings

PAPERLESS TRANSFER PRINTING METHOD

BACKGROUND

Technical Field

The present invention relates to a paperless transfer printing method in the textile industry, and in particular, to an aqueous ink paperless transfer printing method.

Related Art

Transfer printing is one of the methods used for textile printing. It began in the late 1960s. In the printing method, first, a particular dye is printed on paper or another material, and then heat pressing or the like is used, to transfer a pattern onto a fabric. Transfer printing is considered to be the most important invention following reactive dyes in the textile industry and a revolution on printing process. Compared with the conventional process, this process saves time, effort, and water. Contributing to a small degree of paper shrinkage, and accurate color registration, a pattern is clear and exquisite, flexibly printed, and can be produced in large quantities or by a small batch. Thus, the transfer printing enjoys rapid development.

Basic mechanisms of the existing transfer printing technology mainly include a sublimation method, a migration method, a melting method and a printing ink layer stripping method. The sublimation method is the most common method in which the sublimation property of a disperse dye is used. Printing ink is made by using a disperse dye having a molecular weight of 250 to 400 and a particle diameter of 0.2 to 2 microns and a water-soluble carrier or an alcohol-soluble carrier such as an oil-soluble resin. Then, treatment is performed on the printing ink on a transfer printing machine at 200-230° C. for 20-30 seconds, so that the disperse dye is transferred onto and glued on synthetic fiber such as polyester. In the migration method, emulsifying treatment is first performed on a fabric by using a mixed liquid including a color fixing agent and a paste, then a dye is transferred and fixed onto the fabric from transfer printing paper by heat pressing and migrating in a wet state, and finally wet treatment such as steaming and washing is performed. When the dye is transferred, a relatively great pressure between the fabric and the paper is required. In the melting method, a printing ink layer of transfer printing paper has basic ingredients of dye and wax. A printing ink layer is embedded into the fabric by melt pressing, so that a part of printing ink is transferred onto fiber, and then corresponding post-treatment is performed according to the nature of dye. When the melting method is used, a relatively great pressure is required, and a transfer rate of a dye increases with an increase in the pressure. In the printing ink layer stripping method, printing ink that can be firmly adhered to the fiber in heat is used. Under a relatively small pressure, an entire printing ink layer can be transferred onto a fabric from transfer printing paper, and then corresponding color-fixing treatment is performed according to the nature of dye.

In recent years, the transfer printing technology trends in a paperless direction, and some institutes have begun to develop some paperless transfer printing devices. For example, CN1091190C claims to protect a paperless heat transfer printing technology in which heat transfer paper is replaced with a metal foil. According to the method, a printing ink pattern of a blended transfer printing dye is printed on a metal foil by using a roller, and then the dye is sublimated onto a fabric at a selected temperature and pressure, to implement heat transfer printing. CN101786373A discloses a paperless active transfer printing machine. A mechanism of the paperless active transfer printing machine uses a structure similar to that of a conventional transfer printing machine in which paper is used as a transfer printing temporary carrier, but a recyclable plastic belt is used instead of paper as a transfer printing temporary carrier to achieve paperless. However, during actual application, it is found that, first, in the disclosed paperless transfer printing technical solutions, a core mechanism still mainly includes a sublimation method, or a migration method, or a printing ink layer stripping method, and therefore a conventional transfer printing mechanism is still used, and it is merely considered to use paper substitutes to achieve paperless; second, in all the disclosed paperless transfer printing technical solutions, a recyclable material such as a metal foil or a plastic belt is used instead of paper, solvent type printing ink needs to be used to print a pattern onto a metal foil or plastic, and there is a large amount of volatilization of organic solvent in a production process; third, to obtain a high precision printing effect, a surface of a metal foil or a plastic belt needs to be processed in an electrical corona discharging manner or another manner, and after the plastic belt is recycled and used for several times, a surface treatment effect disappears, thereby causing a severe decrease of printing quality.

SUMMARY

Therefore, the present invention is directed to provide a paperless transfer printing method. According to the paperless transfer printing method, a high precision and high quality printing effect can be implemented at low costs, low energy consumption, and high transfer printing efficiency while paperless is implemented.

According to the present invention, the paperless transfer printing method includes the following steps: (a) printing, by a printing machine, aqueous ink onto a transfer printing temporary carrier in a set pattern, wherein a surface of the transfer printing temporary carrier is made of an elastic polymer material, and a critical surface tension of the surface of the transfer printing temporary carrier is between 25 mN/m and 45 mN/m, and a surface tension of the aqueous ink is less than the critical surface tension of the transfer printing temporary carrier; (b) drying the to-be-transferred pattern on the transfer printing temporary carrier; (c) wetting the transfer printing temporary carrier by using an aqueous surface tension increasing liquid, so that when the transfer printing temporary carrier is in tight contact with a fabric in a transfer printing device to transfer the pattern, the aqueous ink printed on the transfer printing temporary carrier is dissolved or dispersed into the aqueous surface tension increasing liquid to form an aqueous solution or an aqueous dispersion liquid, wherein a surface tension of the aqueous solution or the aqueous dispersion liquid is greater than the critical surface tension of the transfer printing temporary carrier and less than a surface tension of fiber of the fabric; and (d) separating the aqueous solution or the aqueous dispersion liquid from the transfer printing temporary carrier at a tight-contact position between the transfer printing temporary carrier and the fabric, so that an aqueous ink dye is transferred onto the fiber of the fabric.

Optionally, in the step (a), the surface tension of the aqueous ink is less than the critical surface tension of the transfer printing temporary carrier by 1-4 mN/m.

Optionally, in the step (c), the transfer printing temporary carrier is wetted by using the aqueous surface tension increasing liquid carried in the fiber of the fabric by using an anilox roller.

Optionally, in the step (c), the transfer printing temporary carrier is directly wet by using a quantitative humidification system.

Optionally, in the step (c), the transfer printing temporary carrier is wetted by sizing the fabric with the aqueous surface tension increasing liquid by spraying.

Optionally, the transfer printing temporary carrier is a seamless blanket belt or a roller externally wrapped by the elastic polymer material layer.

Optionally, the elastic polymer material is a polyurethane rubber or a polybutyl rubber, and critical surface tensions of the polyurethane rubber and the polybutyl rubber are 29 mN/m and 27 mN/m respectively.

Optionally, a Shore Hardness of the transfer printing temporary carrier is 85 to 95.

Optionally, the aqueous surface tension increasing liquid is deionized water, or distilled water, or an aqueous solution into which a printing and dyeing auxiliary having a concentration below 5% is added, and does not comprise a surface active agent. Optionally, the printing and dyeing auxiliary is a color fixing agent and/or a thickening agent.

Optionally, a formula of the aqueous surface tension increasing liquid includes components of: 0.5-1% of acetic acid, 0.5-1% of pH conditioning agent, 1-1.5% of chelating agent, 2-5% of hygroscopic agent, 1-3% of color fixing agent, and 0.05-0.5% of paste, where a sum of proportions of the components is adjusted to 100% by using water.

Optionally, a formula of the aqueous surface tension increasing liquid includes components of: 10-20% of binder, 0.6-0.9% of slip agent, 3-5% of emulsifying agent, and 0.5% of defoaming agent, where a sum of proportions of the components is adjusted to 100% by using deionized water.

Optionally, the printing machine is a gravure printing machine, a flexo printing machine or a screen printing machine.

Optionally, the aqueous ink is water-soluble reactive dye ink, water-soluble acid dye ink or water-dispersible disperse dye ink.

Optionally, a formula of the water-soluble reactive dye ink includes components of: 5-15% of printing paste, 15-40% of dye, 0.5-1% of anti-staining salt S, 5-8% of consolvent, and 0.5-2% of leveling agent, where a sum of proportions of the components is adjusted to 100% by using water.

Optionally, a formula of the water-soluble acid dye ink includes components of: 20-40% of acid dye, 2-5% of urea, 2-5% of consolvent, 1-1.5% of chelating agent, 0-0.8% of ammonium sulfate, and 2-5% of surface tension conditioning agent, where a sum of proportions of the components is adjust to 100% by using water.

Optionally, a formula of the water-dispersible disperse dye ink includes components of: 15% to 45% of macromolecule disperse dye, 4% to 12% of paste, and 3% to 5% of dispersant, where a sum of proportions of the components is adjusted to 100% by using deionized water.

Optionally, the fabric is a cellulose fiber fabric, and the surface tension of the aqueous solution or the aqueous dispersion liquid formed by wetting the transfer printing temporary carrier satisfies: the surface tension of the aqueous solution or the aqueous dispersion liquid<72 mN/m. Preferably, the surface tension of the aqueous solution or the aqueous dispersion liquid satisfies: 50 mN/m≤the surface tension of the aqueous solution or the aqueous dispersion liquid<70 mN/m.

Optionally, the fabric is a polyester fabric, and the surface tension of the aqueous solution or the aqueous dispersion liquid formed by wetting the transfer printing temporary carrier satisfies: the surface tension of the aqueous solution or the aqueous dispersion liquid<43 mN/m. Preferably, the surface tension of the aqueous solution or the aqueous dispersion liquid satisfies: 35 mN/m<the surface tension of the aqueous solution or the aqueous dispersion liquid<43 mN/m.

Optionally, the fabric is a polyamide fabric, and the surface tension of the aqueous solution or the aqueous dispersion liquid formed by wetting the transfer printing temporary carrier satisfies: the surface tension of the aqueous solution or the aqueous dispersion liquid<42 mN/m. Preferably, the surface tension of the aqueous solution or the aqueous dispersion liquid satisfies: 35 mN/m<the surface tension of the aqueous solution or the aqueous dispersion liquid<42 mN/m.

Optionally, the fabric is a pure silk fabric, and the surface tension of the aqueous solution or the aqueous dispersion liquid formed by wetting the transfer printing temporary carrier satisfies: the surface tension of the aqueous solution or the aqueous dispersion liquid<49 mN/m. Preferably, the surface tension of the aqueous solution or the aqueous dispersion liquid satisfies: 40 mN/m<the surface tension of the aqueous solution<49 mN/m.

Optionally, the paperless transfer printing method further includes: performing color fixing, washing, and shaping to obtain a transfer printing-finished product after separating the fabric from the transfer printing temporary carrier.

Optionally, a speed of the transfer printing device is 5-80 m/min.

According to the method in the present invention, when printing is started, a surface tension of ink is set to be less than a critical surface tension of a transfer printing temporary carrier, so that there is desirable affinity between a printing surface of the transfer printing temporary carrier and the dye ink. Therefore, a complete and exquisite pattern can be printed on the temporary carrier. Afterwards, during transfer printing, the surface tension of the ink is increased to be greater than that of the printing surface of the temporary carrier and less than a surface tension of fiber of a fabric by using an aqueous surface tension increasing liquid. As a result, the affinity between the printing surface of the temporary carrier and the dye ink is significantly reduced, and an ink-resistant status is formed. In addition, the surface tension of the ink dissolved in the aqueous surface tension increasing liquid is still less than the surface tension of the fiber of the fabric, and therefore, desirable affinity is instantly formed between the fiber of the fabric and the ink. In this way, complete transfer printing of ink droplets in an elemental area can be implemented, and the transfer printing temporary carrier has no residual ink, and can be easily repeatedly used in a recycling manner.

The beneficial effects of the present invention lie in that the use of the aqueous ink paperless transfer printing method overcomes disadvantages such as a low dye transfer rate and unstable production of existing paperless transfer printing methods, and improves both quality and output of printing.

DETAILED DESCRIPTION

The following further describes the present invention by way of non-limiting embodiments, but it should be noted that these embodiments should not be construed as a limitation on the present invention.

According to an embodiment of the present invention, aqueous ink can be printed on a transfer printing temporary carrier in a set pattern by using a printing machine such as a gravure printing machine, a flexo printing machine, or a screen printing machine, and then the ink pattern on the transfer printing temporary carrier is transferred onto a fabric to finally form a printing pattern on the fabric, thereby implementing printing of textiles.

A temporary carrier, in a form such as a blanket belt or a roller, made of an elastic polymer material, can be used instead of common paper as the transfer printing temporary carrier. A critical surface tension of the transfer printing temporary carrier is between 25 mN/m and 45 mN/m. Transfer printing tests are performed on combinations of temporary carriers of different materials, various fabrics, and ink formulas, to obtain the following exemplary embodiments. It should be understood that the present invention is not limited to the embodiments described below.

Embodiment 1: Paperless Transfer Printing for a Cotton Fabric

Fabric specification: 100% knitted cotton of 150 g/m$^2$

Cotton is common fiber in cellulose fiber, and a surface tension of the cotton fiber is >72 mN/m.

A polyurethane rubber with a critical surface tension of 29 mN/m is used as an external wrapping material, to produce a polyurethane rubber roller transfer printing temporary carrier. A surface of the polyurethane rubber roller has a Shore Hardness of 90.

Reactive dye ink is formulated, and a formula of the ink includes components of:

5-15% of printing paste;
15-40% of dye;
0.5-1% of anti-staining salt S;
5-8% of consolvent; and
0.5-2% of leveling agent, where
a sum of proportions of the components is adjusted to 100% by using water.

The ink components are adjusted in the foregoing ranges, so that surface tensions of the ink are 23 mN/m, 25 mN/m, 27 mN/m, 28 mN/m, 29 mN/m, and 31 mN/m respectively.

The reactive dye ink is printed on the surface of the polyurethane rubber roller in a set pattern by using a gravure printing machine, and a printing effect of the pattern on the polyurethane rubber roller is shown in Table 1 below.

TABLE 1

| Transfer printing temporary carrier material | Dye ink surface tension | Printing effect |
| --- | --- | --- |
| Polyurethane rubber (with a critical surface tension of 29 mN/m) | 23 | Ink dot is not formed |
| | 25 | Ink dot is relatively complete |
| | 27 | Ink dot is complete and full |
| | 28 | Ink dot is complete and full |
| | 29 | Ink spreads and flows |
| | 31 | No ink is held, ink flows, and a carrier is not dyed |

It can be learned from the foregoing table that, when a surface tension of the ink is less than a critical surface tension of the polyurethane rubber roller, the ink freely spreads on a surface of the rubber roller and wets the surface of the rubber roller. If the surface tension of the ink is greater than the critical surface tension of the rubber roller, liquid droplets do not spread on the rubber roller, and the rubber roller is not wetted. However, if the surface tension of the ink is excessively small, an ink dot may not be easily formed, or a formed ink dot is not sufficiently stable or even formed in a "satellite shape". Preferably, the surface tension of the dye ink may be less than the critical surface tension of the polyurethane rubber roller by 1 to 4 mN/m.

To-be-transferred printing may be dried in a transfer printing device. When the transfer printing device operates, a cotton fabric is fed into a transfer printing unit. Before the cotton fabric is in tight contact with the polyurethane rubber roller, on the surface of the polyurethane rubber roller, the reactive dye ink on the surface of the rubber roller can be wetted through a quantitative humidification system by using deionized water or distilled water as a surface tension increasing liquid, so that the reactive dye ink is re-dissolved in water, and the surface tension of the reactive dye ink is increased by using a water volume added by the quantitative humidification system. The moment when the temporary carrier is in tight contact with the fabric to transfer printing in the transfer printing device, a surface tension of an aqueous ink solution whose surface tension is increased is greater than the critical surface tension of the polyurethane rubber roller and less than a surface tension of a cotton fiber. Therefore, the aqueous reactive dye ink solution is separated from the surface of the polyurethane rubber roller, so that the aqueous reactive dye ink solution spreads on a surface of the cotton fiber and wets the surface of the cotton fiber. In this way, the reactive dye in the aqueous ink is transferred onto the cotton fiber.

By adjusting a humidification amount of the quantitative humidification system, different ink surface tensions can be obtained. Printing effects under different ink surface tensions are shown in Table 2.

TABLE 2

| Fabric material | Surface tension of ink printed on a transfer printing temporary carrier after the ink is re-wetted | Printing effect |
| --- | --- | --- |
| Cotton (whose critical surface tension is >72 mN/m) | 26 | Transfer printing cannot be performed, and dye does not dye a cloth surface |
| | 30 | Dye transfer rate is low and is approximately 60% |
| | 40 | Dye transfer rate is relatively low and is approximately 80% |
| | 50 | Dye transfer rate is high and is >95%, and a cloth surface printing effect is desirable |
| | 70 | Dye transfer rate is high and is >98%, but dye is obviously overprinted on a cloth surface |

According to this embodiment, to achieve a desirable transfer printing effect, a surface tension of an aqueous solution formed by wetting the polyurethane rubber roller satisfies: 29 mN/m<the surface tension of the aqueous solution<72 mN/m, and more preferably, 50 mN/m≤the surface tension of the aqueous solution<70 mN/m.

Finally, after separated from the polyurethane rubber roller, the cotton fabric is color-fixed, washed, and shaped, to become a reactive dye printing-finished product of the cotton fabric.

Preferably, a speed for transferring printing is 45 m/min.

Embodiment 2: Paperless Transfer Printing for a Polyester Fabric

Fabric: Polyester Crepe

Fabric specification: Material is polyester 111dtex (DTY) X111dtex (DTY) that has a density of 256×256 filaments/10 cm and a weight of 142 g/m².

A surface tension of polyester fiber is 43 mN/m.

A polyurethane rubber with a critical surface tension of 29 mN/m is used as a material, to wrap a roller, and produce a polyurethane rubber roller transfer printing temporary carrier. A surface of the polyurethane rubber roller has a Shore Hardness of 92.

Disperse dye ink is formulated, and a formula of the ink includes components of:

15% to 45% of macromolecule disperse dye,
4% to 12% of paste, and
3% to 5% of dispersant, where
a sum of proportions of the components is adjusted to 100% by using deionized water.

The ink components are adjusted in the foregoing ranges, so that surface tensions of the disperse dye ink are 23 mN/m, 25 mN/m, 27 mN/m, 28 mN/m, 29 mN/m, and 31 mN/m respectively.

The disperse dye ink is printed on a surface of the polyurethane rubber roller transfer printing temporary carrier in a set pattern by using a screen printing machine, and a printing effect of the pattern is shown in the following Table 3.

TABLE 3

| Transfer printing temporary carrier material | Dye ink surface tension | Printing effect |
|---|---|---|
| Polyurethane rubber (with a critical surface tension of 29 mN/m) | 23 | Ink dot is not formed |
| | 25 | Ink dot is relatively complete |
| | 27 | Ink dot is complete and full |
| | 28 | Ink dot is complete and full |
| | 29 | Ink spreads and flows |
| | 31 | No ink is held, ink flows, and a carrier is not dyed |

It can be learned from the foregoing table that, when a surface tension of ink is less than a critical surface tension of the polyurethane rubber roller, the ink freely spreads on a surface of the rubber roller and wets the surface of the rubber roller. If the surface tension of the ink is greater than the critical surface tension of the rubber roller, liquid droplets do not spread on the rubber roller, and the rubber roller is not wetted. However, if the surface tension of the ink is excessively small, an ink dot may not be easily formed, or a formed ink dot is not sufficiently stable or even formed in a "satellite shape". Preferably, the surface tension of the dye ink is less than the critical surface tension of the polyurethane rubber roller by 1 to 4 mN/m.

To-be-transferred printing is dried. When a transfer printing device operates, a polyester fabric is fed into a transfer printing unit. Before the polyester fabric is in tight contact with the polyurethane rubber roller, the polyester fabric is sized with an aqueous surface tension increasing liquid by spraying. A formula of an aqueous increasing liquid includes components of:

10-20% of binder,
0.6-0.9% of slip agent,
3-5% of emulsifying agent, and
0.5% of defoaming agent, where
a sum of proportions of the components is adjusted to 100% by using deionized water.

The moment when the polyurethane rubber roller is in tight contact with the fabric to transfer printing in the transfer printing device, water-dispersible disperse dye ink printed on the polyurethane rubber roller re-disperses into the aqueous surface tension increasing liquid, and a surface tension of a formed aqueous dispersion solution is greater than the surface tension of the polyurethane rubber roller and less than the surface tension of polyester fabric fiber. Therefore, a surface contact angle between the aqueous dispersion solution and the polyurethane rubber roller is greater than zero, and the aqueous dispersion solution is separated from the surface of the polyurethane rubber roller, so that the aqueous dispersion solution spreads on a surface of the polyester fabric fiber and wets the surface of the polyester fabric fiber. In this way, a disperse dye in the water-dispersible disperse dye ink is transferred onto the polyester fabric fiber.

By adjusting a spraying and sizing amount for the fabric, different surface tensions of the ink on the polyurethane rubber roller can be obtained.

Printing effects under different ink surface tensions are shown in Table 4.

TABLE 4

| Fabric material | Surface tension of ink printed on a transfer printing temporary carrier after the ink is re-wetted | Printing effect |
|---|---|---|
| Polyester (whose critical surface tension is >43 mN/m) | 26 | Ink dot is not formed |
| | 30 | Ink dot is relatively complete |
| | 35 | Ink dot is complete and full |
| | 40 | Ink dot is complete and full |
| | 45 | Ink spreads and flows |
| | 50 | No ink is held, ink flows, and a carrier is not dyed |

According to this embodiment, to achieve a desirable transfer printing effect, a surface tension of an aqueous dispersion liquid formed by wetting ink on the polyurethane rubber roller satisfies: 29 mN/m<the surface tension of the aqueous dispersion liquid<43 mN/m, and preferably, 35 mN/m≤the surface tension of the aqueous dispersion liquid<43 mN/m.

Finally, after separated from the polyurethane rubber roller, the polyester fabric is color-fixed, washed, and shaped, to become a disperse dye printing-finished product of the polyester fabric.

Preferably, a speed for transferring printing is 40 m/min.

Embodiment 3: Paperless Transfer Printing for a Polyamide Fabric

Fabric: Taslon
Material: 100% polyamide with a specification of 70 D×160 D
A surface tension of polyamide fiber is 42 mN/m.
A polybutyl rubber with a critical surface tension of 27 mN/m is used as a material, to produce a seamless annular-shaped blanket belt, to produce a polybutyl rubber blanket belt transfer printing temporary carrier. A surface of the polybutyl rubber blanket belt has a Shore Hardness of 85.
Acid dye ink is formulated, and a formula of the ink includes components of:
 20-40% of acid dye,
 2-5% of urea,
 2-5% of consolvent;
 1-1.5% of chelating agent,
 0-0.8% of ammonium sulfate, and
 2-5% of surface tension conditioning agent, where
 a sum of proportions of the components is adjusted to 100% by using water.

The ink components are adjusted in the foregoing ranges, so that surface tensions of the acid dye ink are 21 mN/m, 23 mN/m, 25 mN/m, 26 mN/m, 29 mN/m, and 31 mN/m respectively.

The acid dye ink is printed on a surface of the polybutyl rubber blanket belt transfer printing temporary carrier in a set pattern by using a flexo printing machine, and a printing effect of the pattern is shown in the following Table 5.

TABLE 5

| Transfer printing temporary carrier material | Dye ink surface tension | Printing effect |
|---|---|---|
| Polybutyl rubber (with a critical surface tension of 27 mN/m) | 21 | Ink dot is not formed |
| | 23 | Ink dot is relatively complete |
| | 25 | Ink dot is complete and full |
| | 26 | Ink dot is complete and full |
| | 29 | Ink spreads and flows |
| | 31 | No ink is held, ink flows, and a carrier is not dyed |

It can be learned from the foregoing table that, when a surface tension of the ink is less than a critical surface tension of the polybutyl rubber blanket belt, the ink freely spreads on a surface of the blanket belt and wets the surface of the blanket belt. If the surface tension of the ink is greater than the critical surface tension of the blanket belt, liquid droplets do not spread on the blanket belt, and the blanket belt does not wetted. However, if the surface tension of the ink is excessively small, an ink dot may not be easily formed, or a formed ink dot is not sufficiently stable or even formed in a "satellite shape". Preferably, when an ink pattern is printed onto the blanket belt, the surface tension of the dye ink is less than the critical surface tension of the polybutyl rubber blanket belt by 1-4 mN/m.

Then, to-be-transferred printing is dried. When a transfer printing device operates, a polyamide fabric is fed into a transfer printing unit. Before the polyamide fabric is in tight contact with the polybutyl rubber blanket belt, the polyamide fabric is sized with an aqueous surface tension increasing liquid by using an anilox roller. A formula of an aqueous increasing liquid includes components of:
 0.5-1% of acetic acid,
 0.5-1% of pH conditioning agent,
 1-1.5% of chelating agent,
 2-5% of hygroscopic agent,
 1-3% of color fixing agent, and
 0.05-0.5% of paste, where
 a sum of proportions of the components is adjusted to 100% by using water.

The moment when the polybutyl rubber blanket belt is in tight contact with the polyamide fabric to transfer printing in the transfer printing device, aqueous acid dye ink printed on the polybutyl rubber blanket belt is dissolved into the aqueous surface tension increasing liquid, and a surface tension of a formed aqueous solution is greater than the surface tension of a surface of the polybutyl rubber blanket belt and less than the surface tension of the polyamide fabric fiber. Therefore, a contact angle between the aqueous solution and the surface of the polybutyl rubber blanket belt is greater than zero, and the aqueous solution is separated from the surface of the polybutyl rubber blanket belt, so that the aqueous solution spreads on the surface of the polyamide fabric fiber and wets the surface of the polyamide fabric fiber. In this way, an acid dye in the aqueous ink is transferred onto the polyamide fabric fiber. Printing effects under different surface tensions of wetted ink are shown in Table 6.

TABLE 6

| Fabric material | Surface tension of ink printed on a transfer printing temporary carrier after the ink is re-wetted | Printing effect |
|---|---|---|
| Polyamide (whose critical surface tension is >42 mN/m) | 26 | Ink dot is not formed |
| | 30 | Ink dot is relatively complete |
| | 35 | Ink dot is complete and full |
| | 40 | Ink dot is complete and full |
| | 45 | Ink spreads and flows |
| | 50 | No ink is held, ink flows, and a carrier is not dyed |

Therefore, according to this embodiment, to achieve a desirable transfer printing effect, a surface tension of an aqueous solution formed by wetting the polybutyl rubber blanket belt satisfies: 27 mN/m<the surface tension of the aqueous solution<42 mN/m, and preferably, 35 mN/m≤the surface tension of the aqueous solution<42 mN/m.

Finally, after separated from the polybutyl rubber blanket belt, the polyamide fabric is color-fixed, washed, and shaped, to become an acid dye printing-finished product for the polyamide fabric.

Preferably, a speed for transferring printing is 30 m/min.

Embodiment 4: Paperless Transfer Printing for a Pure Silk Fabric

Fabric: Habotai
Material: 100% silk with a specification of 40 g/m$^2$
Similar to that in Embodiment 3, when a transfer printing temporary carrier is a polybutyl rubber blanket belt, and other parameters do not change, cold transfer printing is performed on the silk fabric, and printing effects under different surface tensions of re-wetted ink are shown in Table 7.

TABLE 7

| Fabric material | Surface tension after re-wetting of ink printed on transfer printing temporary carrier | Printing effect |
| --- | --- | --- |
| Pure silk (with a critical surface tension of 49 mN/m) | 26 | Ink dot is not formed |
| | 30 | Ink dot is incomplete |
| | 35 | Ink dot is relatively complete |
| | 40 | Ink dot is complete and full |
| | 45 | Ink dot is complete and full |
| | 50 | Ink spreads and flows |
| | 55 | No ink is held, ink flows, and a carrier is not dyed |

Therefore, to achieve a desirable transfer printing effect, a surface tension of an aqueous solution formed by wetting the polybutyl rubber blanket belt satisfies: 27 mN/m<the surface tension of the aqueous solution<49 mN/m, and preferably, 40 mN/m≤the surface tension of the aqueous solution<49 mN/m.

It can be learned from the foregoing embodiments that, if a surface tension of re-wetted ink is excessively large, the ink does not easily forms small micro-droplets, and the ink does not wet the fabric. A surface tension of ink needs to be less than a surface tension of fiber, for example, a surface tension of cotton is greater than 72 mN/m, a surface tension of polyester is 43 mN/m, a surface tension of polyamide is 42 mN/m, and a surface tension of silk is 49 mN/m; if a surface tension of the ink is greater than a surface tension of a fabric, liquid droplets do not spread on a surface of the fabric, and the fabric is not wetted. If the surface tension of the ink is excessively small, an ink dot may not be easily formed, or a formed ink dot is not sufficiently stable or even formed in a "satellite shape".

Some alternative transfer printing methods fall within the scope of the present invention. The alternative methods include a plurality of changes of combinations of transfer printing temporary carriers made of various elastic polymer materials, fabrics, inks, surface tension increasing liquids, and surface tension parameters.

Although the present invention is shown and described in accordance with specific illustrative embodiments, the present invention is not limited to the exemplary embodiments. It should be understood that a person skilled in the art can make modifications and variation to the exemplary embodiments without departing from the scope and spirit limited by claims or equivalent content of the present invention.

What is claimed is:

1. A paperless transfer printing method, comprising:
   (a) printing, by a printing machine, aqueous ink onto a transfer printing temporary carrier in a set pattern, wherein a surface of the transfer printing temporary carrier is made of an elastic polymer material, a critical surface tension of the surface of the transfer printing temporary carrier is between 25 mN/m and 45 mN/m, and a surface tension of the aqueous ink is less than the critical surface tension of the transfer printing temporary carrier;
   (b) drying the to-be-transferred pattern on the transfer printing temporary carrier;
   (c) wetting the transfer printing temporary carrier by using an aqueous surface tension increasing liquid, so that when the transfer printing temporary carrier is in tight contact with a fabric in a transfer printing device to transfer a pattern, the aqueous ink printed on the transfer printing temporary carrier is dissolved or dispersed into the aqueous surface tension increasing liquid to form an aqueous solution or an aqueous dispersion liquid, wherein a surface tension of the aqueous solution or the aqueous dispersion liquid is greater than the critical surface tension of the transfer printing temporary carrier and less than a surface tension of fiber of the fabric; and
   (d) separating the aqueous solution or the aqueous dispersion liquid from the transfer printing temporary carrier at a tight-contact position between the transfer printing temporary carrier and the fabric, so that an aqueous ink dye is transferred onto the fiber of the fabric.

2. The paperless transfer printing method according to claim 1, wherein in the step (a), the surface tension of the aqueous ink is less than the critical surface tension of the transfer printing temporary carrier by 1-4 mN/m.

3. The paperless transfer printing method according to claim 1, wherein in the step (c), the transfer printing temporary carrier is wetted by using the aqueous surface tension increasing liquid carried in the fiber of the fabric by using an anilox roller or is directly wetted by using a quantitative humidification system, or is wetted by sizing the fabric with the aqueous surface tension increasing liquid by spraying.

4. The paperless transfer printing method according to claim 1, wherein the transfer printing temporary carrier is a seamless blanket belt or a roller externally wrapped by the elastic polymer material layer.

5. The paperless transfer printing method according to claim 1, wherein the elastic polymer material is a polyurethane rubber or a polybutyl rubber, and critical surface tensions of the polyurethane rubber and the polybutyl rubber are 29 mN/m and 27 mN/m respectively.

6. The paperless transfer printing method according to claim 1, wherein a Shore Hardness of the transfer printing temporary carrier is 85 to 95.

7. The paperless transfer printing method according to claim 1, wherein the aqueous surface tension increasing liquid is deionized water, or distilled water, or an aqueous solution into which a printing and dyeing auxiliary having a concentration below 5% is added, and does not comprise a surface active agent.

8. The paperless transfer printing method according to claim 7, wherein the printing and dyeing auxiliary is a color fixing agent and/or a thickening agent.

9. The paperless transfer printing method according to claim 1, wherein a formula of the aqueous surface tension increasing liquid comprises components of: 0.5-1% of acetic acid, 0.5-1% of pH conditioning agent, 1-1.5% of chelating agent, 2-5% of hygroscopic agent, 1-3% of color fixing agent, and 0.05-0.5% of paste, wherein a sum of proportions of the components is adjusted to 100% by using water.

10. The paperless transfer printing method according to claim 1, wherein a formula of the aqueous surface tension increasing liquid comprises components of: 10-20% of binder, 0.6-0.9% of slip agent, 3-5% of emulsifying agent, and 0.5% of defoaming agent, wherein a sum of proportions of the components is adjusted to 100% by using deionized water.

11. The paperless transfer printing method according to claim 1, wherein the printing machine is a gravure printing machine, a flexo printing machine or a screen printing machine.

12. The paperless transfer printing method according to claim 1, wherein the aqueous ink is water-soluble reactive dye ink, water-soluble acid dye ink or water-dispersible disperse dye ink.

13. The paperless transfer printing method according to claim 12, wherein a formula of the water-soluble reactive dye ink comprises components of: 5-15% of printing paste, 15-40% of dye, 0.5-1% of anti-staining salt S, 5-8% of cosolvent, and 0.5-2% of leveling agent, wherein a sum of proportions of the components is adjusted to 100% by using water.

14. The aqueous ink paperless transfer printing method according to claim 12, wherein a formula of the water-soluble acid dye ink comprises components of: 20-40% of acid dye, 2-5% of urea, 2-5% of cosolvent, 1-1.5% of chelating agent, 0-0.8% of ammonium sulfate, and 2-5% of surface tension conditioning agent, wherein a sum of proportions of the components is adjusted to 100% by using water.

15. The paperless transfer printing method according to claim 12, wherein a formula of the water-dispersible disperse dye ink comprises components of: 15% to 45% of macromolecule disperse dye, 4% to 12% of paste, and 3% to 5% of dispersant, wherein a sum of proportions of the components is adjusted to 100% by using deionized water.

16. The paperless transfer printing method according to claim 1, wherein the fabric is a cellulose fiber fabric, and the surface tension of the aqueous solution or the aqueous dispersion liquid formed by wetting the transfer printing temporary carrier satisfies: 50 mN/m≤the surface tension of the aqueous solution or the aqueous dispersion liquid<70 mN/m.

17. The paperless transfer printing method according to claim 1, wherein the fabric is a polyester fabric, and the surface tension of the aqueous solution or the aqueous dispersion liquid formed by wetting the transfer printing temporary carrier satisfies: 35 mN/m≤the surface tension of the aqueous solution or the aqueous dispersion liquid<43 mN/m.

18. The paperless transfer printing method according to claim 1, wherein the fabric is a polyamide fabric, and the surface tension of the aqueous solution or the aqueous dispersion liquid formed by wetting the transfer printing temporary carrier satisfies: 35 mN/m≤the surface tension of the aqueous solution or the aqueous dispersion liquid<42 mN/m.

19. The paperless transfer printing method according to claim 1, wherein the fabric is a pure silk fabric, and the surface tension of the aqueous solution or the aqueous dispersion liquid formed by wetting the transfer printing temporary carrier satisfies: 40 mN/m≤the surface tension of the aqueous solution<49 mN/m.

20. The paperless transfer printing method according to claim 1, further comprising: performing color fixing, washing, and shaping to obtain a transfer printing-finished product after separating the fabric from the transfer printing temporary carrier.

* * * * *